3,152,133
2-HYDRAZINOQUINOLINE HYDRAZONE WITH 1-METHYL-4-PIPERIDONE AND RELATED COMPOUNDS
Harman S. Lowrie, Glenview, Ill., assignor to G. D. Searle & Co., Chicago, Ill., a corporation of Delaware
No Drawing. Filed July 29, 1963, Ser. No. 298,455
4 Claims. (Cl. 260—288)

The present invention relates to a group of compounds which are hydrazones of 2-hydrazinoquinoline. The carbonyl-related portion of the hydrazone is derived from a cyclic ketone containing a nitrogen atom in the ring. In particular, the present invention relates to a group of compounds having the following general formula

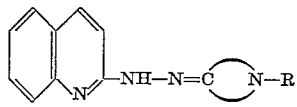

wherein R is selected from the group consisting of lower alkyl and benzyl and

is selected from the group consisting of

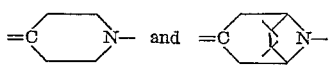

The lower alkyl radicals referred to above contain up to six carbon atoms and are exemplified by radicals such as methyl, ethyl, propyl, butyl, and hexyl.

Equivalent to the basic amines of this invention for the purposes here described are their non-toxic acid addition salts and quaternary ammonium salts. Such salts are formed with a variety of inorganic and strong organic acids including sulfuric, phosphoric, hydrochloric, citric, maleic, and related acids. Quaternary ammonium salts are formed with a variety of organic esters of sulfuric, hydrohalic, and aromatic sulfonic acids. Among such esters are methyl chloride and bromide, ethyl chloride, propyl chloride, ethyl sulfate, methyl benzenesulfonate, ethylene chlorohydrin, and allyl bromide.

The compounds of the present invention are useful because of their valuable pharmacological properties. More particularly, they possess diuretic activity. In addition, they possess anti-bacterial activity which is demonstrated by their inhibition of the growth of the organism *Diplococcus pneumoniae* and they are inhibitors of germination of seeds of trifolium.

The compounds of this invention can be prepared by heating 2-hydrazinoquinoline with the appropriate 1-substituted 4-piperidone or 3-tropanone. The reaction is carried out in an inert solvent preferably in the presence of a trace of acid to catalyze the reaction. Useful inert solvents are alcohols such as ethanol or 2-propanol or hydrocarbon solvents such as benzene, toluene, heptane, or octanes. When hydrocarbon solvents are used, it is desirable to remove the water from the reaction mixture as it is formed by means of a water trap.

The compounds which constitute this invention and their preparation will appear more clearly from a consideration of the following examples which are given for the purpose of illustration only and are not to be construed as limiting the invention in spirit or in scope. In these examples, quantities are indicated in parts by weight, and temperatures in degrees centigrade (° C.).

*Example 1*

A mixture of 8 parts of 2-hydrazinoquinoline, 6.2 parts of 1-methyl-4-piperidone, 0.1 part of acetic acid, and 280 parts of mixed octanes is refluxed for 6.5 hours in an apparatus equipped with a water trap. The solvent is then removed from the reaction mixture under reduced pressure and the residue is stirred with pentane. The solid which forms is then separated and recrystallized first from hexane and then from ether to give 2-hydrazinoquinoline hydrazone with 1-methyl-4-piperidone. This compound melts at about 137–138° C. and it has the following formula

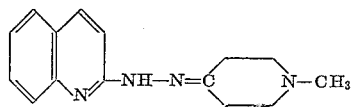

*Example 2*

If an equivalent quantity of 1-ethyl-4-piperidone is substituted for the 1-methyl-4-piperidone and the procedure described in Example 1 is repeated, the product is 2-hydrazinoquinoline hydrazone with 1-methyl-4-piperidone.

*Example 3*

A mixture of 10 parts of 1-benzyl-4-piperidone, 8 parts of 2-hydrazinoquinoline, 0.1 part of acetic acid and 280 parts of mixed octanes is refluxed for 6 hours in an apparatus equipped with a water trap. The reaction mixture is concentrated to about ¼ the original volume and then cooled. The solid which crystallizes is separated and recrystallized from hexane to give 2-hydrazinoquinoline hydrazone with 1-benzyl-4-piperidone. This compound melts at about 117–118° C. and it has the following formula

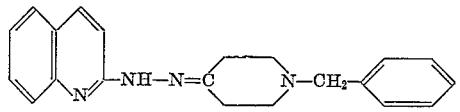

*Example 4*

8.4 parts of 3-tropanone is substituted for the 6.2 parts of 1-methyl-4-piperidone and the reaction described in Example 1 is repeated. The residue obtained by evaporation of the solvent from the reaction mixture is dissolved in ether and washed with dilute potassium carbonate solution. The ether solution is dried and the solvent is evaporated to leave an oily residue which is recrystallized from hexane. The product thus obtained is 2-hydrazinoquinoline hydrazone with 3-tropanone and it melts at about 162–164° C. This compound has the following formula

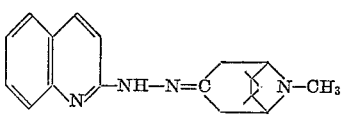

What is claimed is:
1. A compound of the formula
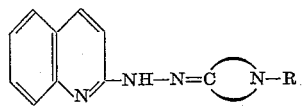
wherein R is selected from the group consisting of lower alkyl and benzyl and
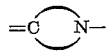
is selected from the group consisting of
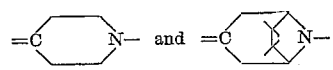
2. A compound of the formula
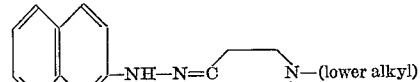
3. 2-hydrazinoquinoline hydrazone with 1-methyl-4-piperidone.
4. 2-hydrazinoquinoline hydrazone with 1-benzyl-4-piperidone.
No references cited.